(12) United States Patent
Liou et al.

(10) Patent No.: US 6,188,469 B1
(45) Date of Patent: Feb. 13, 2001

(54) LASER APPARATUS AND METHOD FOR SPEED MEASUREMENT

(75) Inventors: Wan-Rone Liou, Tainan; Tony Kuo-Ti Chen, Ping-Chen; Kuo-Tso Chen, Hsin-Chu; Chao-Chi Huang, Taipei, all of (TW)

(73) Assignee: Quarton, Inc. (TW)

( * ) Notice: Under 35 U.S.C. 154(b), the term of this patent shall be extended for 0 days.

(21) Appl. No.: 09/322,200

(22) Filed: May 28, 1999

(51) Int. Cl.$^7$ .................................. G01P 3/36; G01P 3/04
(52) U.S. Cl. .................................................. 356/28; 73/511
(58) Field of Search ................................. 356/28; 73/511

(56) References Cited

U.S. PATENT DOCUMENTS

| | | | |
|---|---|---|---|
| 3,567,951 | * | 3/1971 | Montgomery et al. . |
| 4,155,647 | * | 5/1979 | Michel . |
| 4,201,467 | * | 5/1980 | Hartmann et al. ...................... 356/28 |
| 4,312,592 | * | 1/1982 | Sabater et al. ......................... 356/28 |
| 4,989,969 | * | 2/1991 | Siebert et al. .......................... 356/28 |
| 5,298,738 | * | 3/1994 | Gebert et al. . |
| 5,512,998 | * | 4/1996 | Puschell ................................ 356/28 |
| 5,617,199 | | 4/1997 | Dunne . |
| 5,715,045 | | 2/1998 | Dunne . |
| 5,812,249 | | 9/1998 | Johnson et al. . |

* cited by examiner

Primary Examiner—Stephen C. Buczinski
(74) Attorney, Agent, or Firm—Raymond Sun

(57) ABSTRACT

An apparatus for measuring the speed of an object includes a first laser source for emitting a first laser plane at an intended path, and a second laser source for emitting a second laser plane at the intended path, with the second laser source positioned from the first laser source at a known distance. The apparatus further includes a detector system positioned to receive a first laser light and a second laser light that have been reflected from the first laser plane and the second laser plane, respectively, upon reflection of the first and second laser planes off the object. The detector system generates a first pulse signal and a second pulse signal, respectively, in response to the receipt of the first and second laser lights, respectively. The apparatus also includes a signal processing circuit coupled to the detector system for calculating the speed of an object passing through the intended path based on the first and second pulse signals generated by the detector system.

3 Claims, 5 Drawing Sheets

LASER APPARATUS AND METHOD FOR SPEED MEASUREMENT

BACKGROUND OF THE INVENTION

1. Field of the Invention

The present invention relates to speed measurement, and in particular, to a laser apparatus and method for speed measurement.

2. Description of the Prior Art

Speed measurement has long been used by traffic enforcement personnel in measuring the speed of vehicles. However, speed measurement is now becoming increasingly popular in a number of other applications. One such application is in the field of sports, where it has become popular to measure the speed of a ball, such as a baseball pitcher's pitches, a tennis serve, and a soccer shot, among others. Another application is in the measurement of the speed of a bullet fired from a gun.

Most of the currently-available speed measurement devices use the Doppler principle, where the target's interference with an emitted wave causes a reflection from the target. The wavelength of the reflected wave is used to determine the speed of the target. One drawback with such speed measurement devices is that they require a user to focus the device on the target, and they cannot be operated effectively without human intervention unless the target is guaranteed to cross the path of the device. This effectively limits the number of applications to which the device can be used.

Laser has also been used to measure the speed of moving objects. As one example, U.S. Pat. No. 5,812,249 to Johnson discloses a system having two opposing laser sources and detectors that are used to measure the speed of a passing vehicle. A significant drawback with this system is that the laser sources and detectors must be set up to be opposite to each other, so that this system is again limited in the number of applications that it can be used with.

Thus, there remains a need for an effective and accurate, yet inexpensive, apparatus and method for measuring the speed of an object, which is simple in construction, is convenient to use, and is capable of measuring the speed of a wide variety of objects in many different applications without the need for human manipulation or control.

SUMMARY OF THE DISCLOSURE

It is an object of the present invention to provide an apparatus and method for measuring the speed of a moving object.

It is another object of the present invention to provide an apparatus and method for measuring the acceleration of a moving object.

The objects of the present invention may be accomplished by providing an apparatus for measuring the speed of an object. The apparatus includes a first laser source for emitting a first laser plane at an intended path, and a second laser source for emitting a second laser plane at the intended path, with the second laser source positioned from the first laser source at a known distance. The apparatus further includes a detector system positioned to receive a first laser light and a second laser light that have been reflected from the first laser plane and the second laser plane, respectively, upon reflection of the first and second laser planes off the object. The detector system generates a first pulse signal and a second pulse signal, respectively, in response to the receipt of the first and second laser lights, respectively. The apparatus also includes a signal processing circuit coupled to the detector system for calculating the speed of an object passing through the intended path based on the first and second pulse signals generated by the detector system.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known circuits and components are omitted so as to not obscure the description of the present invention with unnecessary detail.

The present invention provides a laser apparatus and method for measuring the speed of a passing object. The apparatus includes two laser sources that are spaced apart from each other at a known distance for emitting two separate laser light planes. When an object travels through the path of the two parallel laser light planes, the two laser light planes will cause laser light to be reflected at different times by the object. The apparatus also includes a detector system that is positioned to detect the two reflected laser lights. Based on the times at which the two reflected laser lights are detected, the apparatus can determine the speed of the travelling object as the object passes through the vicinity of the apparatus. The apparatus can also be modified to determine the acceleration of the passing object.

Figure 1:
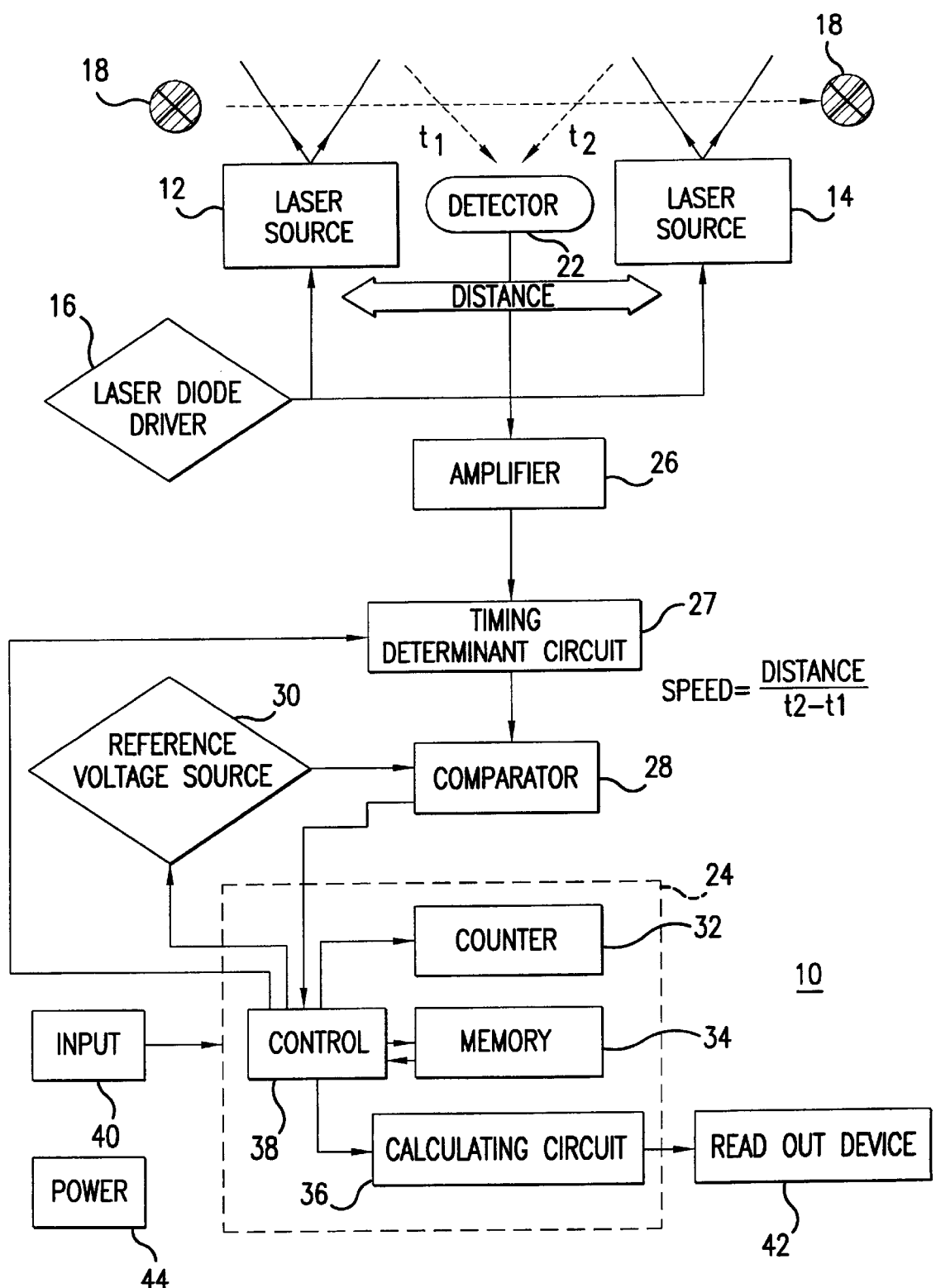
FIG. 1 is block diagram illustrating a laser speed measurement apparatus according to an embodiment of the present invention.
Figure 2:
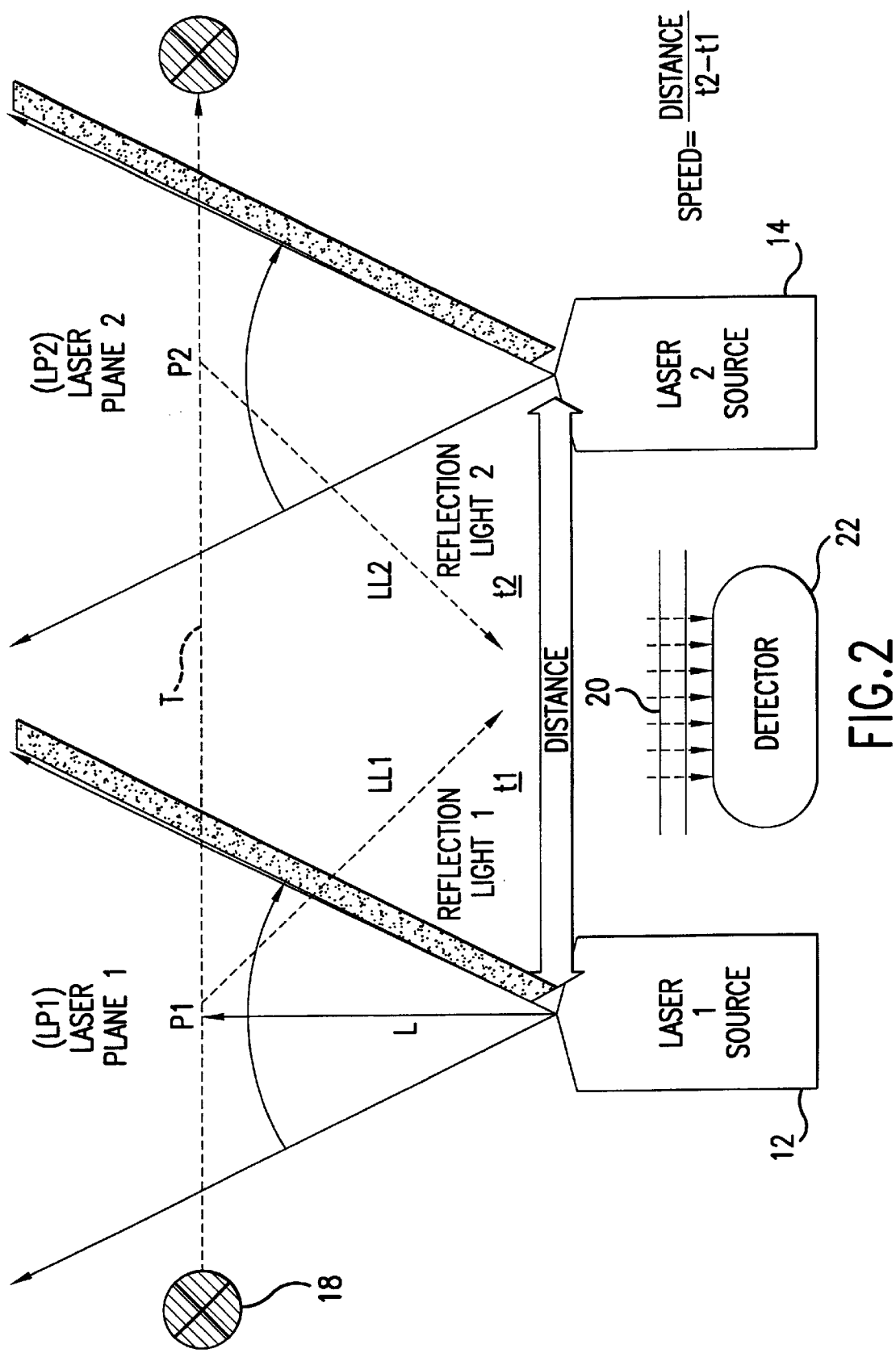
FIG. 2 is an enlarged view of the laser sources and detector system of FIG. 1.

FIG. 1 illustrates a block diagram of a laser apparatus 10 according to an embodiment of the present invention. The apparatus 10 has two laser sources 12 and 14 that are provided at a known predetermined spaced-apart distance, such as 20 cm, even though any distance is possible. Each laser source 12, 14 can be a conventional laser module, such as the VLM-635-23L, VLM-635-24L, VLM-655-21L, VLM-655-22L, VLM-670-21L and VLM-670-22L sold by Quarton, Inc., of Taiwan, that has a laser diode for continuously emitting a laser plane LP1 and LP2, respectively. Each laser plane LP1 and LP2 spans about 45 degrees, as shown in greater detail in FIG. 2, which provides an enlarged view of the laser apparatus 10 at the location of the laser sources 12, 14. Each laser source 12, 14 can be driven by a high power laser driver circuit 16 coupled thereto, and which is well-known in the laser art. The laser driver 16 provides constant current to each laser source 12, 14 to ensure the continuous emission of laser planes LP1 and LP2 thereat. Each laser plane LP1 or LP2 is generally triangular, with L representing the distance from the laser source 12, 14 to the location where an object 18 is expected to cross through the path of the laser plane LP1 or LP2, and P1 and P2 representing the points where the object 18 crosses the laser planes LP1 and LP2, respectively.

The apparatus 10 further includes a lens 20 and a detector system 22 that are adapted to receive reflected laser light. The lens 20 can be provided in front of each of the detector system 22 to facilitate more effective collection of the reflected light, and can be provided with a filter which filters out unwanted noise to improve the signal-to-noise ratio. When an object 18 passes through the laser plane LP1 of laser source 12, the laser light from laser source 12 will impinge on the object 18 and cause laser light LL1 to be reflected from the object 18.

When the laser light LL1 is reflected from point P, the reflected laser light LL1 can be passed through the lens and filter 20, and is then received by detector system 22. As the object 18 continues its path of travel, it will pass through the laser plane LP2 of laser source 14. At that time, the laser light from laser source 14 will impinge on the object 18 and cause laser light LL2 to be reflected from the object 18. When the laser light LL2 is reflected from point P, the reflected laser light LL2 can be passed through lens and filter 20 and is also received by detector system 22. As detector system 22 receives each reflected laser light LL1, LL2, it generates a pulse signal that is provided to the signal processing unit 24 described below, where a time is assigned to the receipt of each such pulse signal, and these times are used to calculate the speed of the object 18.

The detector system 22 can be a single detector (as shown in FIG. 1), or as described below in connection with FIG. 4, can provide one detector for each laser source. Each detector 22 can be embodied in the form of a PIN diode, photodetector, phototransistor or photodiode. In addition, in the embodiment of FIGS. 1 and 2, the lens and filter 20 and the detector 22 are positioned at about the mid-point between the laser sources 12, 14 along the same imaginary straight line that connects the laser sources 12, 14 (see FIG. 2). Thus, this positioning provides the detector 22 on the same side as the laser sources 12, 14. The "same side" is considered to be on one side of the line T in FIG. 2 that represents the path of travel of the object 18. This positioning is found to provide optimal detection of the reflected laser lights LL1 and LL2. However, the lens and filter 20 and the detector 22 can be positioned anywhere with respect to the laser sources 12, 14, as long as the detector 22 is capable of "catching" the reflected laser lights LL1 and LL2 from both laser sources 12, 14, and the correct adjustments are made to account for (1) the differing distances, and (2) the times of travel, for the reflected laser lights LL1 and LL2.

Figure 6:
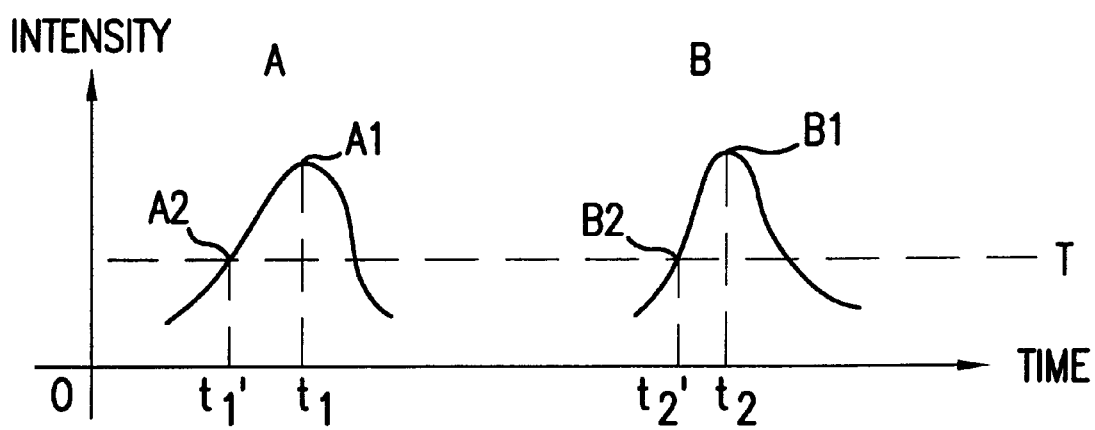
FIG. 6 is a graph illustrating intensity curves for two pulses.

An amplifier 26 can be coupled to the output of detector 22 to amplify each pulse signal received from detector 22. A timing determinant circuit 27 can be coupled to the output of the amplifier 26. The timing determinant circuit 27 functions to improve the accuracy of the time of receipt of the pulse signals. For example, the timing determinant circuit 27 can be configured to operate as a peak value detection circuit in which it detects the point in the intensity curve where each received pulse reaches a maximum. Referring to FIG. 6, the curves A and B may represent the intensity curves for two different pulses. Each curve A and B has a peak value A1 and B1 respectively, which occurs at times t1 and t2, respectively. Thus, the control block 38 (described below) which is coupled to the timing determinant circuit 27 can assign a time t1 or t2 for a given pulse when a peak or maximum value A1 or B1 of the intensity of the pulse is detected. The pulse is only passed on to the comparator 28 (described below) when the peak value is reached. By using peak values to assign times for pulses, errors in the measured time differences described below can be minimized. In other words, the timing determinant circuit 27 assists the apparatus 10 in consistently assigning receipt times for each received pulse, so as to minimize potential errors in determining the time differences between receipt times. For example, instead of detecting peak values, the timing determinant circuit 27 can be configured to measure the point along an intensity curve where the pulse crosses a threshold T or other value. In FIG. 6, this point is represented by A2 and B2 for curves A and B, respectively, and are assigned receipt times t1' and t2', respectively.

A comparator 28 can be coupled to the output of timing determinant circuit 27 to compare the amplified pulse signal with a reference voltage provided by a reference voltage source 30. The reference voltage is preferably selected to represent a sufficiently high threshold value to effectively distinguish the true reflected laser light signals LL1 and LL2 from environment noise and other reflected light signals that may be received by detector 22. The reference voltage source 30 is coupled to the signal processing unit 24 so that the user can adjust and control the reference voltage, if desired. If the amplified pulse signal is greater than the reference voltage, this means that the pulse signal represents a true reflected laser light signal LL1 or LL2, and it is then provided to the signal processing unit 24 for further processing. Otherwise, the pulse signal is deemed to be noise, and is discarded. Thus, the amplifier 26, timing determinant circuit 27, comparator 28 and reference voltage circuit 30 represent a signal detection circuit that distinguishes a true reflected laser light signal LL1 or LL2 from unwanted noise or other unwanted signals.

The signal processing unit 24 includes a counter 32, a memory 34, a calculating circuit 36, and a control block 38. The control block 38 is coupled to the output of the comparator 28 to receive the pulse signal. The counter 32 has an input coupled to the control block 38 so that the control block 38 can cause the counter 32 to start counting upon the control block's 38 receipt of the pulse signal from the comparator 28. The memory 34 has an input coupled to the output of the control block 38 to store preset parameters, the time data (such as the times at which the first and second pulse signals are received), and the count or time between the first and second pulse signals. The calculating circuit 36 has an input coupled to the control block 38 and functions to perform the speed calculations described below. The control block 38 is coupled to the timing determinant circuit 27 and the reference voltage source 30 to control their operations (as described above). The control block 38 also has an input coupled to an input panel 40, which can be a keypad and which can include buttons or other controls which allow the user to control the operation of the apparatus 10. For example, the input panel 40 can include the "ON/OFF" switches, and controls for selecting "yards/meters" or other settings or parameters. In a non-limiting embodiment, the control block 38 can be implemented in the form of a processor.

In operation, when the pulse signal is determined to be greater than the reference voltage (i.e., when laser light LL1 is received by detector 22), the control block 38 causes the counter 32 to start counting. The counter 32 continues to count until the next pulse signal is determined to be greater than the reference voltage. This next pulse signal should have been generated by the reflected laser light LL2 from the second laser source 14. Upon the receipt of this next pulse signal by the control block 38, the control block 38 causes the counter 32 to stop counting. The count in the counter 32 can then be stored in memory 34, and is then provided via the control block 38 to the calculating circuit 36, which calculates the speed of the object 18 using the following simple equation:

$$\text{Speed} = \text{distance/time} \tag{1}$$

with time being the difference between time t2 (when reflected laser light LL2 is received) and time t1 (when reflected laser light LL1 is received). In the present invention, t2−t1 is reflected by the count of the counter 32. Since the distance between laser sources 12, 14 is fixed and known, the calculating circuit 36 can easily and quickly determine the speed, which is then provided to a read out device 42 (such as an LCD or LED display) for display to the user.

In addition, the apparatus 10 can also include a power supply 44, which can be a conventional battery source for providing power to the apparatus 10. In this context, the apparatus 10 can be embodied in a hand-held unit 46, as shown in FIG. 3, with all the components of FIG. 1 provided in a housing 48 of the hand-held unit 46.

Figure 3:
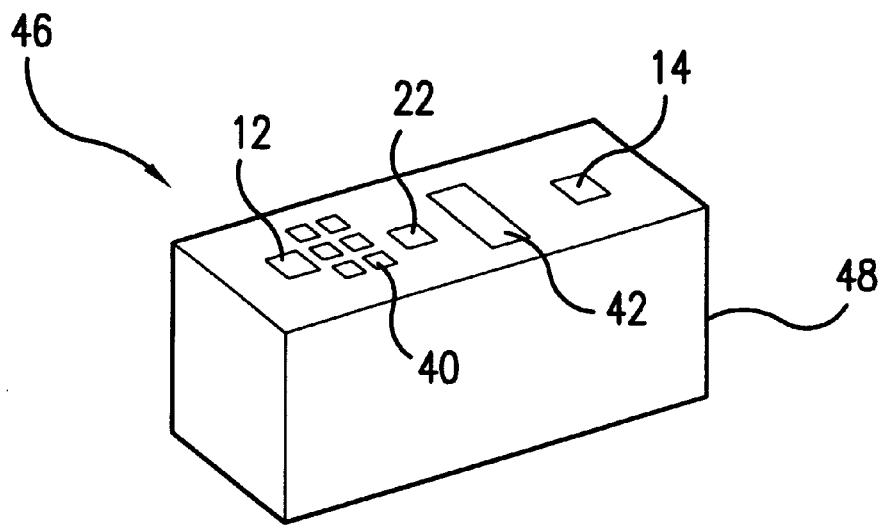
FIG. 3 illustrates a hand-held unit into which the apparatus of FIG. 1 can be embodied.

In a preferred embodiment of the present invention, the distance between laser sources 12, 14 can be kept very small (such as 20 cm) so that the apparatus 10 can be fitted in a small hand-held unit, as shown in FIG. 3. However, if the target 18 to whose speed is to be measured is larger than 20 cm, then the distance between laser sources 12, 14 must be increased accordingly.

Figure 4:
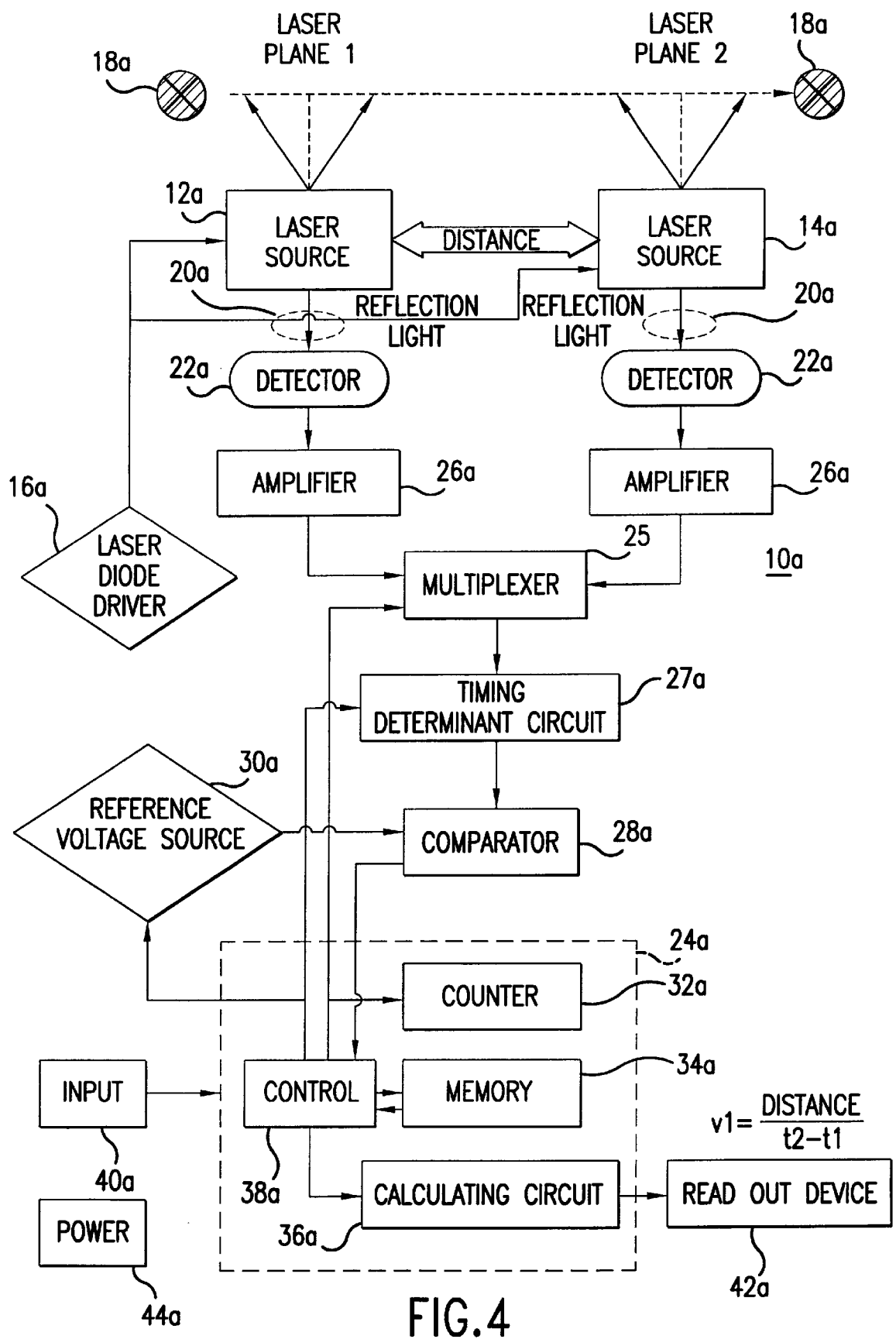
FIG. 4 is block diagram illustrating a modification to the apparatus of FIG. 1.

FIG. 4 illustrates another embodiment of the apparatus 10a which actually includes a few modifications to the apparatus 10 of FIG. 1. The elements or components of the apparatus 10a in FIG. 4 that are the same as the elements of the apparatus 10 are provided with the same numeral designations except that an "a" has been added to the numeral designations in FIG. 4. One difference is that the single detector 22 in FIG. 1 has been replaced by an individual detector 22a for each laser source 12a and 14a. Each detector 22a can be the same as detector 22 in FIG. 1, and each detector 22a is preferably positioned adjacent (e.g., attached to) its laser source 12a or 14a so that the path of the reflected pulse to the detectors 22a is more direct and the individual detectors 22a will be able to collect more of the reflected light. In addition, each detector 22a is coupled to its own corresponding amplifier 26a, whose outputs are coupled to a multiplexor 25. The multiplexor 25 can be a conventional multiplexor, and functions to select the outputs from the various amplifiers 26a so that the reflected pulse from the first laser source 12a and its detector 22a is always read first before the reflected pulse from the second laser source 14a and its detector 22a (assuming the object 18a passes through the laser plane LP1 first). The multiplexor 25 is controlled by the control block 38a, and its output is provided to the timing determinant circuit 27a. The other components of the apparatus 10a, and its operation, are the same as for apparatus 10.

Figure 5:
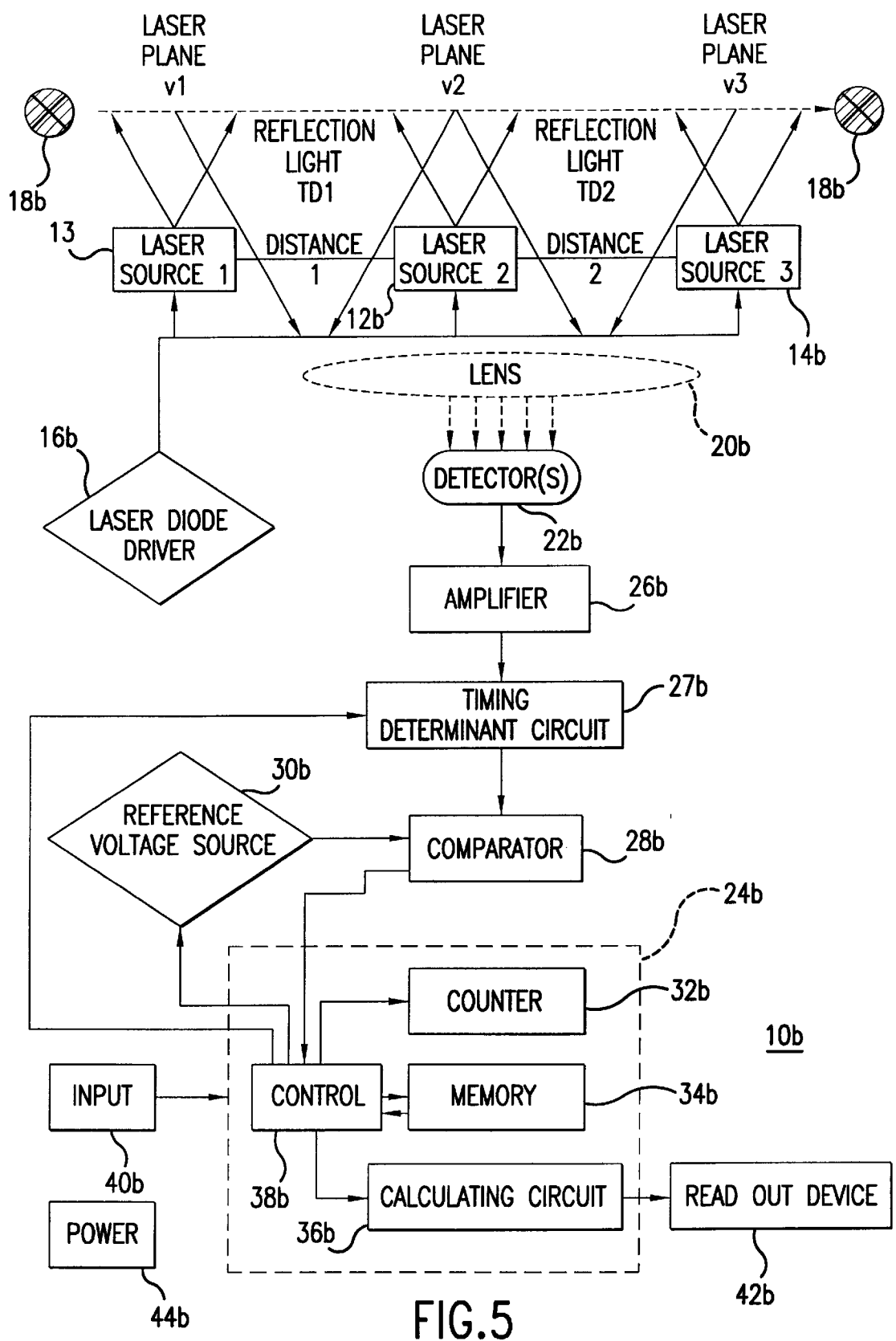
FIG. 5 is a block diagram illustrating how the apparatus of FIG. 1 can be modified to determine acceleration.

FIG. 5 illustrates another embodiment of the apparatus 10b which actually includes a few modifications to the apparatus 10 of FIG. 1 that would allow the apparatus to determine the acceleration of the passing object 18b. The elements or components of the apparatus 10b in FIG. 5 that are the same as the elements of the apparatus 10 are provided with the same numeral designations except that a "b" has been added to the numeral designations in FIG. 5. The apparatus 10b is essentially the same as apparatus 10, except that a third laser source 13 is positioned at a known distance from the laser source 12b. Each laser source 12b, 14b and 13 emits a laser plane so that three reflected lights are received when the object 18b passes the apparatus 10b. Each of these three separate reflected lights can be received by a separate detector 22b (as in FIG. 4), or all three reflected lights can be received by a single detector (as in FIG. 1). The remaining components of the apparatus 10b can be the same as for apparatus 10 of FIG. 1.

The operation of apparatus 10b is similar to that of apparatus 10. The apparatus 10b operates in the same manner as apparatus 10 to determine two time differences:

TD1=t2−t1 (i.e., time difference between when the pulses from laser sources 13 and 12b are received)

TD2=t3−t2 (i.e., time difference between when the pulses from laser sources 12b and 14b are received)

Thus, in contrast to apparatus 10 in which only one time difference is determined, the apparatus 10b determines two time differences. The two time differences TD1 and TD2 and the two known distances (d1, d2) between each adjacent pair of laser sources 12b, 14b and 12b, 13 are used to determine the acceleration of the passing object 18b using the following mathematical equations:

$$d1 = v1*TD1 + (1/2)a*TD1^2 \tag{2}$$

$$d1+d2 = v1*(TD1+TD2) + (1/2)a*(TD1+TD2)^2 \tag{3}$$

where: a=acceleration
v1=velocity at laser plane 1
d1=distance between laser sources 13 and 12b
d2=distance between laser sources 12b and 14b Since equations (2) and (3) present only two unknown variables (acceleration and v1), and the other variables (d1, d2, TD1, TD2) are either known or can be measured, the calculating circuit 36b only needs to solve these two simultaneous equations (using basic mathematical principles) to determine acceleration (a) and v1.

The software in the signal processing unit 24b can be modified or adapted to enable the apparatus 10b to perform the velocity (speed) and acceleration calculations. Thus, the apparatus 10b can be used to calculate the velocity of the passing object 18b by using any two of the laser sources 12b, 13, 14b and applying the principles of FIG. 1 above, or can also be used to calculate the acceleration of the passing object 18b by using all three laser sources 12b, 13, 14b.

Thus, the present invention provides a laser apparatus and method that is simple in construction, and operates based on simple scientific principles (e.g., speed=distance/time), to provide quick, accurate and effective speed measurements. The emission of laser planes LP1 and LP2, and the positioning of the laser sources 12, 14 and detector 22 on the same side, allow the laser apparatus of the present invention to be used without the need for human manipulation or control, thereby increasing the convenience of its use, and allowing the laser apparatus to measure the speed of a wide variety of objects in many different applications. The apparatus 10 can even be conveniently and easily adapted to determine acceleration.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. An apparatus for determining the acceleration of an object, comprising:

a first laser source for emitting a first laser plane at an intended path;

a second laser source for emitting a second laser plane at the intended path, the second laser source positioned from the first laser source at a first known distance;

a third laser source for emitting a third laser plane at the intended path, the third laser source positioned from the second laser source at a second known distance;

a detector system positioned to receive a first laser light, a second laser light, and a third laser light that have been reflected from the first laser plane, the second laser plane and the third laser plane, respectively, and for generating a first pulse signal, a second pulse signal, and a third pulse signal, respectively, in response to the receipt of the first, second and third laser lights, respectively; and a signal processing circuit coupled to the detector for alculating the acceleration of an object passing through the intended path based on the first, second and third pulse signals enerated by the detector system.

2. The apparatus of claim 1, wherein the signal processing circuit calculates the acceleration of an object passing through the intended path based on the times that the first, second and third pulse signals are received by the detector system.

3. The apparatus of claim 1, wherein the detector system is positioned on the same side as the first, second and third laser sources.

* * * * *